Figure 1:
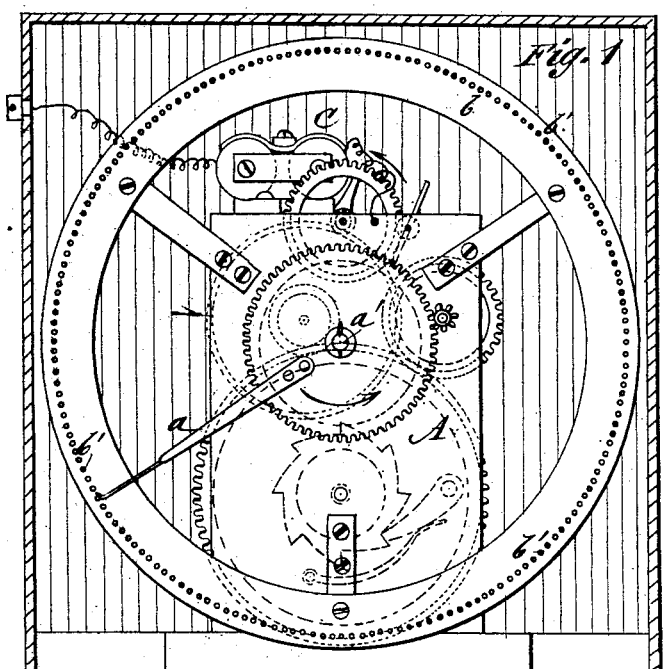

(No Model.) 4 Sheets—Sheet 1.

E. T. QUIMBY.
Automatic Time Register and Alarm.

No. 236,257. Patented Jan. 4, 1881.

WITNESSES:
C. Neveux
C. Sedgwick

INVENTOR:
E. T. Quimby
BY Munn & Co
ATTORNEYS.

(No Model.) 4 Sheets—Sheet 2.
E. T. QUIMBY.
Automatic Time Register and Alarm.
No. 236,257. Patented Jan. 4, 1881.
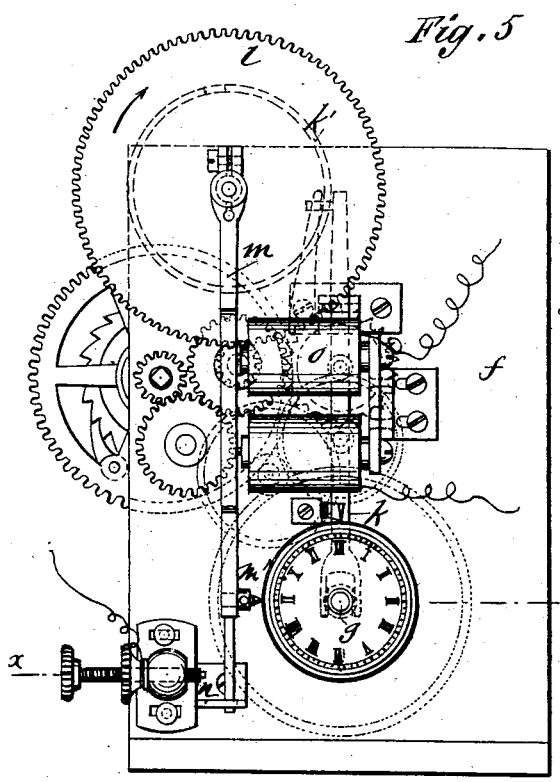
Fig. 5
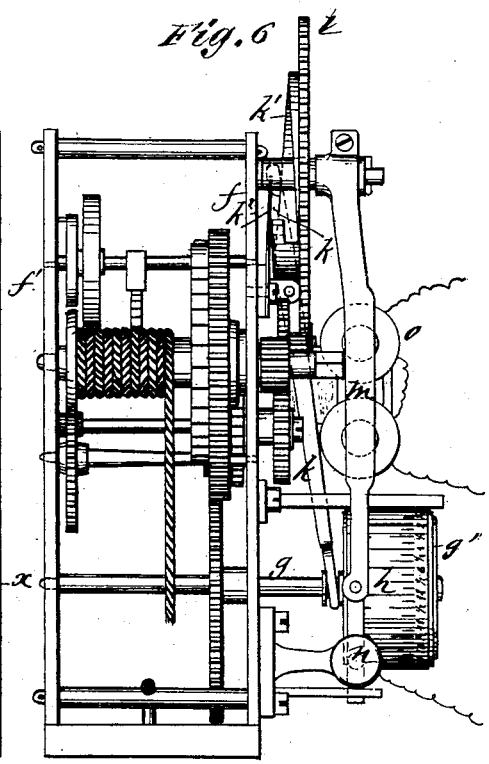
Fig. 6
Fig. 18
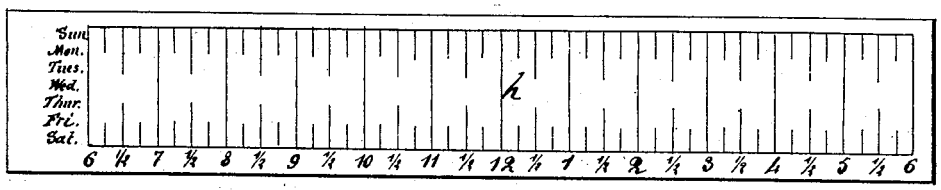
Fig. 10
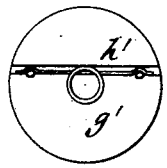
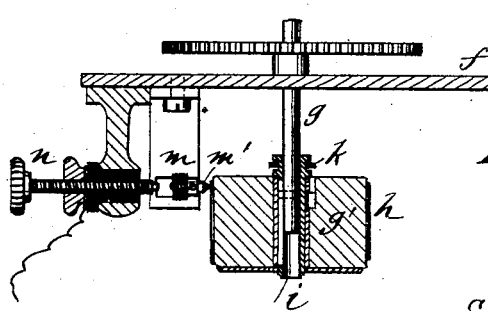
Fig. 7
WITNESSES:
C. Neveux
C. Sedgwick
INVENTOR:
E. T. Quimby
BY Munn & Co
ATTORNEYS.

(No Model.)
E. T. QUIMBY.
Automatic Time Register and Alarm.
No. 236,257. Patented Jan. 4, 1881.
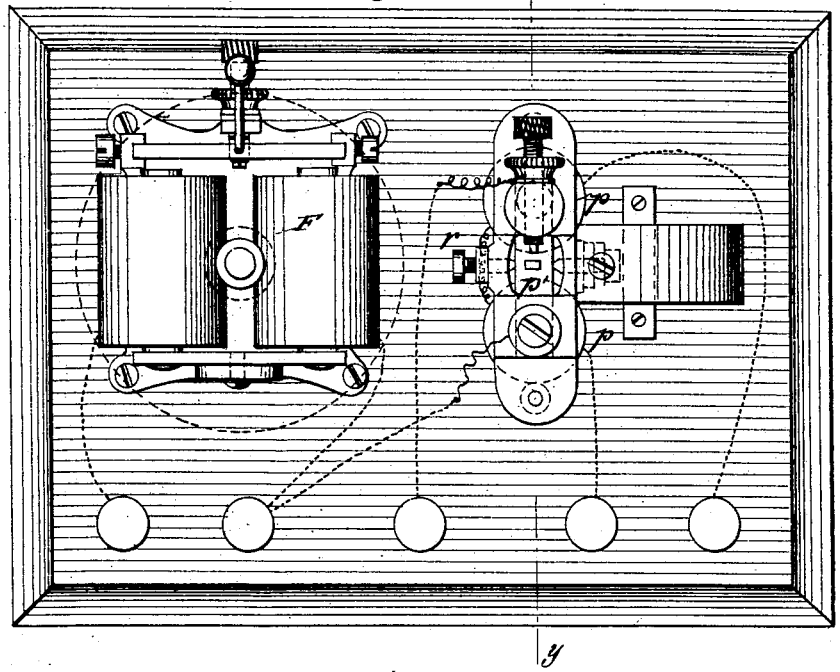
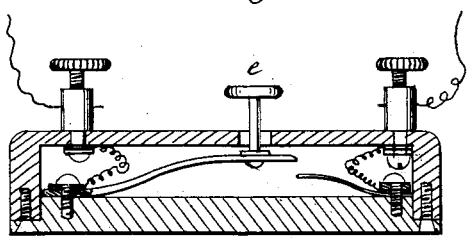
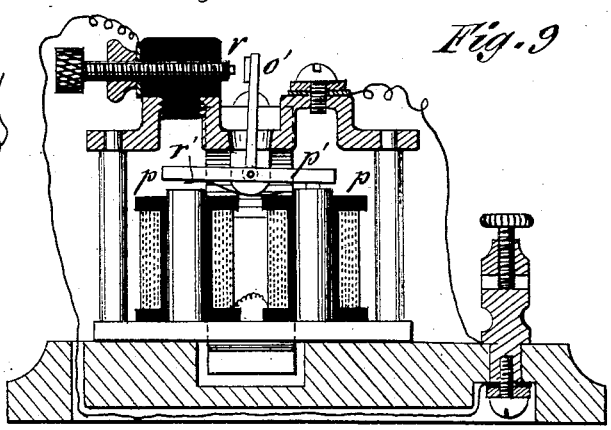
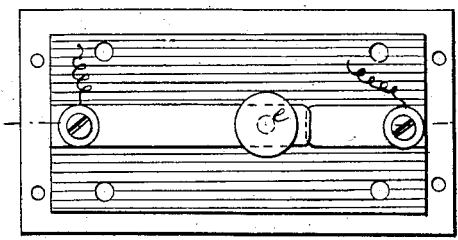
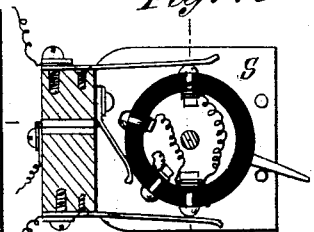
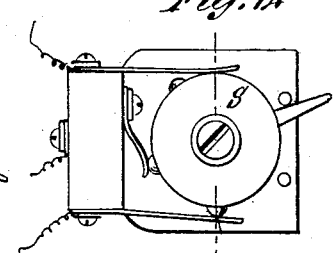
WITNESSES:
C. Neveux
C. Sedgwick
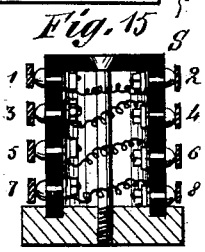
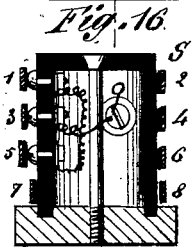
INVENTOR:
E. T. Quimby
BY Munn & Co.
ATTORNEYS.

(No Model.) 4 Sheets—Sheet 4.

E. T. QUIMBY.
Automatic Time Register and Alarm.

No. 236,257. Patented Jan. 4, 1881.

WITNESSES:
C. Neveux
C. Sedgwick

INVENTOR:
E. T. Quimby
BY Munn & Co
ATTORNEYS.

UNITED STATES PATENT OFFICE.

ELIHU T. QUIMBY, OF HANOVER, NEW HAMPSHIRE.

AUTOMATIC TIME-REGISTER AND ALARM.

SPECIFICATION forming part of Letters Patent No. 236,257, dated January 4, 1881.

Application filed May 5, 1880. (No model.)

*To all whom it may concern:*

Be it known that I, ELIHU T. QUIMBY, of Hanover, in the county of Grafton and State of New Hampshire, have invented a new and Improved Electric Alarm and Automatic Register for Watchmen, of which the following is a specification.

My improvements relate to electric alarm and registering apparatus intended for the use of and as a guard upon watchmen to indicate any neglect of duty.

The special objects of my improvements are as follows: First, to cause an alarm at any desired place in case of failure of the watchman from any cause to perform his duty; second, to obtain a permanent record, which shall indicate the time of any dereliction; third, to permit the watchman to operate the distant signal at any time independent of the ordinary working of the apparatus; fourth, to permit the person at the distant point to discern readily between regular and unusual signals; fifth, to so construct the apparatus that it cannot be tampered with.

I make use of a transmitter of peculiar construction operated by a suitable motor, which is locked against movement by the armature of an electro-magnet. The magnet is in a circuit to the distant signal and recording apparatus, and through its transmitting-arm with the finger-levers or press-buttons that are for the use of the watchman. The press-buttons are arranged in number, order, and place, as required, and are each separately connected to the insulated circuit-closing points of the transmitter. The transmitting-arm is fitted to be moved over the insulated points in proper order and in succession as the circuit is closed and the motor released by the action of the magnet.

The recording apparatus is driven by clockwork, which gives continuous motion to a cylinder carrying the record-sheet, and the recording-pencil is operated by the armature of an electro-magnet, which is in the circuit from the transmitter, the action being that the pencil is brought in contact with the paper when the circuit is closed. The armature and pencil-arm are retracted by the clock-work, and such retraction is terminated by an adjustable point, which is connected in the circuit of a local battery and a signaling device. The time occupied by the back movement of the armature is arranged to be greater than the intervals between the currents sent by the transmitter by the proper movements of the watchman, so that the signal shall not be operated, except by failure of the watchman to close the circuit.

Combined with the devices described I arrange at points convenient for the watchman reversing-keys, by which the signal-bell may be operated by a reverse current, and with the distant signal I use a polarized relay, which brings the signal into action by the reverse current. In conjunction with this I apply a switch fitted for cutting out the local battery at the signal, whereby it may be determined whether the signal is being operated by the clock-work or the distant battery, or, what is the same, whether it is by will or negligence of the watchman.

Having thus indicated the general features of my invention, I will describe the construction and operation with reference to the accompanying drawings.

Figure 2:
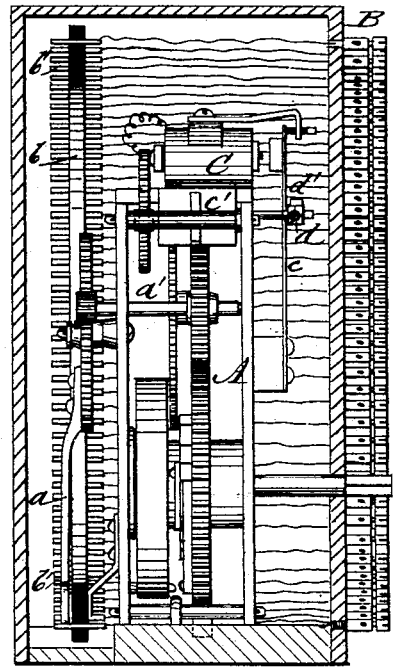
Figure 3:
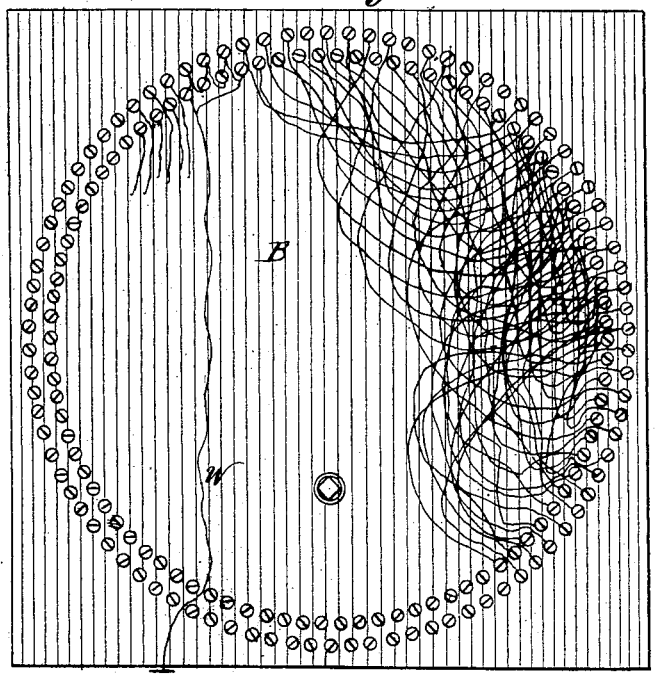
Figure 4:
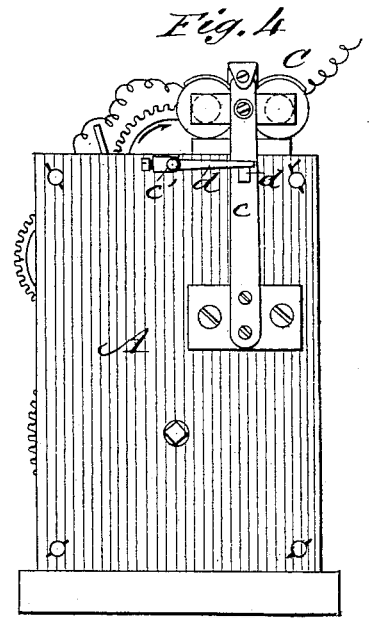
Figure 17:
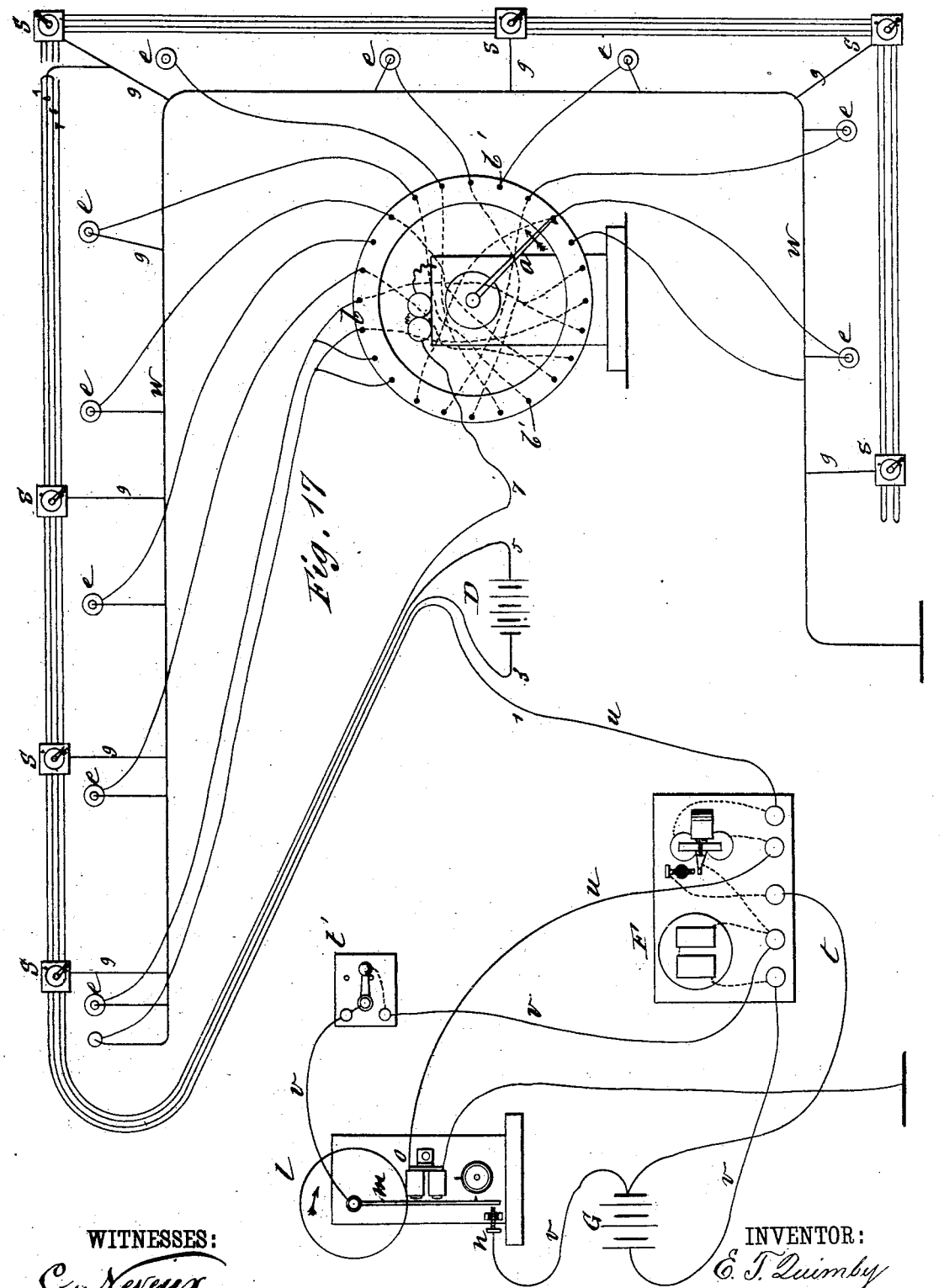

In the drawings, Figure 1 is a front elevation of the transmitter. Fig. 2 is a side elevation of the same, showing also the commutator. Fig. 3 is a face view of the commutator. Fig. 4 is a rear view of the transmitter. Fig. 5 is a front elevation of the recording apparatus and automatic circuit-closer. Fig. 6 is a side elevation of the same. Fig. 7 is a horizontal section on line $x\,x$ of Fig. 5, showing the record-cylinder and pencil-arm. Fig. 8 is a plan view of the signaling apparatus and polarized relay. Fig. 9 is a cross-section of the polarized relay on line $y\,y$ of Fig. 8. Figs. 10 to 16 are detail views, showing the different forms of switches made use of; and Fig. 17 is a diagram illustrating the general arrangement of the whole apparatus and the connections.

Similar letters of reference indicate corresponding parts.

Referring first to Figs. 1, 2, 3, and 4, which show the transmitter, A is a motor driven by a spring or weight or other suitable power fitted to impel the arbor $a'$, that carries the radial spring-arm $a$. Concentric with the arbor $a'$ a ring, $b$, of rubber or other non-conducting material, is fixed and fitted in said ring $b$. Numerous pins, plugs, or metallic knobs $b'$, are fitted in such position as to be insulated from each other, and so that the end of the arm $a$ bears upon said points in succession as the arbor $a'$ is turned. The pins $b'$ connect, by separate wires, with the pins of the commutator B, which, as shown, is formed by the back of the case or box containing the instrument. The screws for connecting the wires are arranged in two concentric circles to give more space, while the pins $b'$ of the ring $b$ are in a single line. I am enabled by this arrangement to obtain a large number of circuit-closing points, $b'$, with a ring, $b$, of small diameter.

Contiguous to the motor A is fixed an electro-magnet, C, the armature of which is carried by a spring-arm, $c$, that is attached on the back plate of the motor. Upon the escapement-arbor $c'$ of the motor is fitted an arm, $d$, which projects at one side of the spring-arm $c$, for engagement with a lug, $d'$, on arm $c$, whereby the motor is held against movement so long as the armature of magnet C remains in a retracted position. The parts are fitted so that the lug $d'$ is disengaged from arm $c$ by movement of the armature to magnet C, and the motor thereby allowed to turn the transmitter-arm $a$, and the gearing is proportioned so that the arbor $c'$ makes a single revolution while the arm $a$ is moving from one point, $b'$, to the next. The electrical connections of these parts are as follows: The arm $a$ connects with magnet C, and magnet C with the battery D and distant instrument. (See Fig. 17.) The pins $b'$, or so many of them as are required, are each separately connected with the ground-wire $w$ by a wire, in which is placed a push-button, $e$, that normally breaks the circuit. As illustrated by Fig. 17, the buttons $e$ are to be arranged in proper order at different places in the beat which the watchman is to traverse, and at such distance apart as may be desired.

The commutator B is used for connecting the pins $b'$ that are not required for use with each other and the ground, and for connecting the pins in use together in case the watchman is to traverse the same beat twice.

In operation, the first button being pressed down, the arm $a$ being at the starting-point, the circuit is closed, through the pin $b'$ and arm $a$, to the distant instrument. The magnet C, being in circuit, acts to relieve the escapement-arm $d$, and the motor moves the arm $a$ to the next pin, $b'$. The circuit is broken the moment arm $a$ commences to move, and consequently the spring-arm $c$, which carries the armature of magnet C, moves outward, and the motor is stopped by engagement of arm $d$ with lug $d'$, and the transmitter-arm $a$ stops upon the second pin $b'$. The same movements take place as each button $e$ is pressed in succession, and it will be seen that to obtain the movement of the transmitter-arm it is necessary to operate the buttons $e$ in proper order, and also that no effect is produced, other than described, by holding the button down. Deception is thus prevented, and to neutralize the effect in case any one of the buttons is wedged down, I prefer to use a circuit-closer such as shown in Figs. 11 and 12, which first closes the circuit and then breaks it, so that it will be difficult to fix the switch permanently closed. It will be understood that the transmitting-instrument will not be accessible to the watchman. In case the round is to be repeated the remaining pins $b'$ will be connected in proper order with those first used. The remaining pins not required will be connected together, and with the ground, so that when the arm $a$ reaches them the circuit will remain closed and the arm will continue to move until it reaches the starting-point.

I now pass to the recording-instrument, (shown in Figs. 5, 6, and 7.) $f f'$ are the front and back plates of a clock-movement driven by a spring or weight, of which movement $g$ is the hour-hand arbor. On the arbor $g$ is fitted a cylinder, $g'$, that for convenience is provided with an hour-dial on its outer end, and has attached to its surface a strip, $h$, of paper, for keeping the record. This strip, $h$, as shown in Fig. 18, is marked with lines dividing it into hours and subdivisions of hours corresponding with the dial. The cylinder $g'$ sets upon a sleeve, $i$, to which the cylinder is held by friction of the surfaces and pressure of the spring $h'$, which is fitted in the cylinder, (see Fig. 10,) so that the cylinder may be adjusted or removed as required. The sleeve $i$ is caused to turn with the arbor $g$ by a pin projecting from the arbor into a slot in the sleeve, so that while cylinder $g'$ is turned with the arbor it may have an endwise movement thereon with the sleeve $i$. This endwise movement is to permit use of the record-strip $h$ for a number of days, and is given by means of a lever, $k$, and cam $k'$. The lever $k$ is hung on the front plate, $f$, and engages, by its forked lower end, with an annular groove in sleeve $i$. The cam $k'$ consists of a spiral flange secured on the back of a wheel, $l$, that is geared to make a revolution in seven days, and the upper end of lever $k$ is caused to bear on the cam $k'$ by a spring, $k^2$, so that during the revolution of wheel $l$ the lever is moved inward and cylinder $g'$ caused to slide on the arbor $g$. At the completion of the revolution of wheel $l$ the abrupt end of the spiral flange $k'$, shown in Fig. 6, comes in contact with the end of lever $k$ and stops the mechanism. The wheel $l$ is geared from the winding-arbor of the clockwork, so that in winding up the clock-work the wheel shall turn backward and return the cam to the starting-point, it being understood that the wheel $l$ makes a single revolution during the winding operation.

Upon the arbor of the wheel $l$ is hung the armature-lever $m$, which carries the pencil $m'$, that marks the record-strip $h$. This arm is forked to stride the arbor of wheel *l*, and is clamped thereto by a set-screw, so that the friction will be sufficient to swing the lower end of the arm away from the cylinder *g'* until stopped by the adjustable set-screw *n*. Upon the front plate, *f*, of the clock-work is fitted an electro-magnet, *o*, which is in the circuit from the transmitter, before described, so that when the circuit is closed the arm *m* is drawn to the cylinder and the pencil-point *m'* marks or indents the strip *h*. The moment the circuit is broken the arm *m* commences to move away from the cylinder, and continues to move until stopped by the set-screw *n*, which may be adjusted so that this movement of the arm shall occupy five, fifteen, or more minutes. The contact of arm *m* with *n* closes a local circuit to the signaling-instrument next described.

I prefer to use for the signals a bell and magnet, as shown at F in Fig. 8, of usual construction, and fitted with an automatic circuit-breaker to cause a continuous signal. The circuit, as shown in Fig. 17, includes a local battery, G, and the switch *t'*, and goes to the screw *n* and the arbor of wheel *l*, so that when the arm *m* is in contact with screw *n* the signal is operated. The lines *v* of Fig. 17 show this local circuit.

It will be seen that unless the distant transmitter is operated in time to prevent contact of arm *m* with screw *n* the signal will be brought into operation. The arrangement will be that the watchman in the proper performance of his duty—that is, by pressing the push-button in proper time and order—prevents any signal, and at the same time a record is made of the action; but in case of negligence, or if, from any cause, the main circuit is not closed at the proper time, the local circuit is closed automatically and the signal given.

In connection with the signaling apparatus I use a polarized relay, (shown in plain view in Fig. 8, and in section in Fig. 9.)

*p p* are the helices of an electro-magnet, and *p'* the polarized armature, pivoted between the poles of the magnet and fitted with tongue *o'*, that is moved to and from the point of the screw *r* by the oscillations of the armature. The magnet is connected in the circuit from the distant transmitter, as shown by the wires *u* in Fig. 17. The screw *n* is connected, through wire *t*, with one pole of the local battery G, and the armature *p'* is connected to the binding-posts of local circuit *v*, so that when the tongue *o'* is moved in contact with screw *r* the local circuit is closed to the signal F. The armature *p'* is fitted with a spring, *r'*, (see Fig. 9,) which tends to retain the armature in a midway position and the tongue *o'* out of contact with screw *r*.

The apparatus is organized in such manner that the currents sent by the transmitter, as before described, shall have no effect to change this normal position of the polarized relay, and so that the local circuit may only be closed by the relay on reversal of the current from the distant station. I provide for such reversal at the will of the watchman by a switch, which reverses the battery of the transmitter. This switch is shown at *s* in Figs. 13, 14, 15, and 16, and the arrangement of such switches for convenient use of the watchman is illustrated by Fig. 17. The reversing-switches will be placed at suitable points in the beat of the watchman, so that any one may be used, as most convenient. The normal position is shown in Fig. 15, wherein the line-wires pass directly through the switches and are connected at their ends 1 to 3 and 5 to 7 and the ground-connection 9 of the switch is cut out, so that the ground-connection of the transmitter-battery is through the press-buttons. The reverse position is shown in Figs. 16 and 17, wherein the line-wire 1 is connected to 5, wire 3 with the ground-connection 9 and direct to ground-wire *w*, the wire 7 and transmitter being thereby cut out.

By manipulation of the switch *s* the watchman may signal in accordance with any prearranged system, or give a continual signal by leaving the switch reversed. The reversing-switch may also be connected in a line to police and fire-alarm stations, arranged to give signals when the current is reversed. Any number of these alarm-bells may be placed in the line at suitable places, which bells, not having the connections for negligence-signals, will be operated only when the current is reversed by the watchman. These arrangements provide for all contingencies likely to arise.

In case a continuous alarm is given by reversal of the transmitter-battery, it is important that the person at the signaling-instrument should be able to determine whether the bell is being operated by the clock-work or by the current from the distant battery. For this purpose the switch *t'* is placed in the circuit of the local battery, so that by turning such switch the circuit is broken, and the bell thereby stopped, unless it is being operated by the distant battery. If the bell continues to ring after the local circuit is broken, it will be evident that the watchman is making a special signal.

By these combined devices it is not only insured that any negligence on the part of the watchman shall be quickly detected, but the watchman may give a special alarm in case of fire, or for other purposes, and also that in case of sickness or injury to the watchman an alarm is given as soon as the proper time for closing the circuit has passed.

I do not limit myself to the construction exactly as shown and described, as the details may be varied without departing from my invention. The recording devices may be dispensed with, if desired, or other devices substituted.

Having thus described my invention, I claim as new and desire to secure by Letters Patent—

1. In transmitters for electric signaling apparatus, the combination, with the revolving arm $a$, fitted to close the circuit intermittently, of a magnet and locking device fitted to arrest the arm $a$ automatically at the intermissions of the current, and a finger key or keys for releasing the locking device, substantially as shown and described.

2. In electric recording-instruments for watchmen, the cylinder $g'$, sleeve $i$, forked lever $k$, wheel $l$, and spiral cam $k'$, combined with the clock-work, magnet, and armature, carrying the recording-pencil, substantially as shown and described.

3. In electric signaling apparatus for watchmen, the combination, with the recording-instrument connected in the main line of a local battery, of signal apparatus and connections, forming a local circuit, when arranged so that the local circuit is closed by the retractive movement of the armature of the recording-instrument, substantially as shown and described.

4. In electric signaling apparatus for watchmen, the combination, with a magnet in the main circuit, of an armature fitted for being retracted by a time-movement, a stop for arresting such backward movement, and a local battery and circuit connections to the back-stop and to a signal, substantially as shown and described.

ELIHU T. QUIMBY.

Witnesses:
F. CHASE,
E. R. RUGGLES.